United States Patent [19]

Najafi

[11] Patent Number: 4,628,519
[45] Date of Patent: Dec. 9, 1986

[54] DIGITAL PHASE-LOCKED LOOP CIRCUIT

[75] Inventor: Hamid Najafi, Palo Alto, Calif.

[73] Assignee: Advanced Micro Devices, Inc., Sunnyvale, Calif.

[21] Appl. No.: 597,767

[22] Filed: Apr. 6, 1984

[51] Int. Cl.[4] .......................... H04L 7/02; H03D 3/24
[52] U.S. Cl. ...................................... 375/110; 328/63; 328/72; 328/155; 331/1 A; 375/120
[58] Field of Search ................. 375/119, 120, 20, 110, 375/108; 331/1 A; 328/155, 63, 72; 329/50

[56] References Cited

U.S. PATENT DOCUMENTS 4,339,823  7/1982  Predina et al. ...................... 375/120

Primary Examiner—Marc E. Bookbinder
Assistant Examiner—Andrew J. Telesz, Jr.
Attorney, Agent, or Firm—Patrick T. King; Mark A. Haynes

[57] ABSTRACT

Disclosed is a digital phase-locked loop circuit for telecommunication circuits receiving bipolar codes. The digital phase-locked loop circuit includes a transition timer means for counting a transition duration between a high mark and a low mark in said bipolar code. A clock recovery signal is generated by dividing a transition duration by a value, such as two, to indicate an apparent zero crossing time, and comparing the apparent zero crossing time with the reference clock in the circuit receiving the bipolar code. The reference clock in the receiving circuit is adjusted in response to the clock recovery signal in order to maintain the reference clock substantially in phase with the incoming bipolar code.

12 Claims, 3 Drawing Figures

DIGITAL PHASE-LOCKED LOOP CIRCUIT

FIELD OF INVENTION

The present invention relates generally to phase-locked loops for clock recovery in circuits receiving bipolar signals, and more particularly, to digital phase-locked loops.

BACKGROUND OF THE INVENTION

For circuits which receive independently generated signals, there is often a need to synchronize the reference clock of the receiving circuit with the timing of the incoming signal. This synchronization is generally accomplished by measuring the phase of the incoming signal with reference to the reference clock of the receiving circuit and adjusting the reference clock so that it will approach operating in perfect phase with the incoming signal. Circuits which accomplish this task are called phase-locked loops.

Assuring that the incoming signal is in phase with the reference clock is particularly important in telecommunications circuits which receive bipolar codes. By keeping the phase of the reference clock locked to that of the incoming signal, the circuit assures that the bipolar code received by the telecommunications circuit will be sampled during the optimum portion of each bit period. Typically, such circuits include a reference clock which counts at a frequency which is a multiple of the frequency of the incoming bipolar code signal. The circuit detects when the bipolar code crosses the zero voltage level and adjusts the counter of the reference clock so that it begins counting close to that point.

Because the bipolar code may be received slightly distorted due to intersymbol interference which may cause more or less than one zero crossing per bit period, or due to "ringing" caused by overshoot, or the like which leads to multiple zero crossings during a single bit period, the phaselocked loop may generate clock jitter as it attempts to lock on to the phase of the incoming signal during these distortions.

For instance, FIG. 1 shows a bipolar code 110 consisting of high marks 100, low marks 101 or spaces 102. Intersymbol interference may cause a code which consists of a high mark followed by a space to have a zero crossing 103 substantially overlapping into the bit period for the space. When the prior circuit detected that zero crossing 103 and corrected the reference clock due to the distortion and then readjusted at the end of the succeeding bit period 104 which is not distorted, the reference clock would jitter. Further, in a code which consists of a high mark then a space or a low mark then a space, as the signal swings from the mark to the zero level of the space there may be overshoot causing "ringing" which generates a series of very quick zero crossings 105. As the prior art circuit attempted to adjust the reference clock for each zero crossing, the reference clock would jitter.

An additional problem with the prior art phase-locked loop circuit is the size and energy consumption of the analog zero detector which is necessary in those circuits.

Thus, there is a need for an apparatus which will reduce clock jitter caused by intersymbol interference and "ringing" which causes multiple zero crossings. Further, there is a need for a circuit which will eliminate the large and inefficient analog zero crossing detector used by art prior devices.

SUMMARY OF THE INVENTION

In accordance with the foregoing, the present invention provides an apparatus for maintaining one signal in phase with another which eliminates the need to detect actual zero crossings in the incoming signal. Rather the receiver locks on only to zero crossings due to the "mark to mark" transitions. The receiving circuit need only detect when magnitude of the signal crosses the high threshold level corresponding to a high mark and when the it crosses the low threshold level corresponding to the low mark of the signal in order to accomplish the clock recovery for a circuit receiving the incoming signal.

Thus in a circuit for receivng a bipolar signal with a high threshold level and a low threshold level, an apparatus for a clock recovery for the reference clock signal is provided. Transition timer means for counting a duration of a transition time for a transition between a high threshold level and low threshold level in the bipolar signal detects the mark to mark transitions. When the duration of a transition time exceeds a preselected portion of the bit period, the transition detected cannot be a clean mark to mark transition and is disregarded.

Recovery means for generating from the transition time a clock recovery signal is provided which indicates the timing of the reference clock signal relative to the incoming bipolar signal.

The recovery means includes in one embodiment a divider means for dividing the transition time by a value at the end of the transition to generate an apparent zero crossing time during the transition. Comparator means for comparing the apparent zero crossing time with the reference clock signal indicates whether the clock is ahead of, behind, or in phase with the incoming bipolar signal and generates the clock recovery signal accordingly.

Last, adjustment means for adjusting the reference clock signal in response to the clock recovery signal is provided in order to maintain the reference clock signal substantially in phase with the bipolar signal.

Thus, an apparatus is provided which eliminates the problems due to reliance on detecting the actual zero crossing of the incoming bipolar code. Clock jitter is reduced in the present invention and the need to provide an analog zero crossing detector is eliminated.

BRIEF DESCRIPTION OF THE DRAWING

The advantages and further features of the present invention will become apparent and better understood by reference to the following detailed description of the invention when considered in conjunction with the accompanying drawings, wherein like-reference numerals designate like-parts throughout the figures thereof, and wherein.

DETAILED DESCRIPTION OF THE PREFERRED EMBODIMENT

With reference to the drawings, a detailed description of the preferred embodiment is provided.

Figure 1:
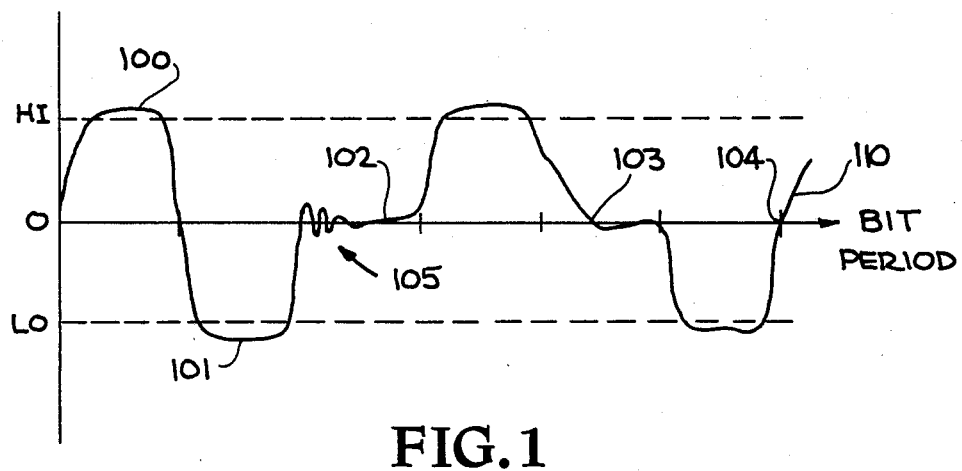
FIG. 1 is a graphic illustration of a bipolar signal.
Figure 2:
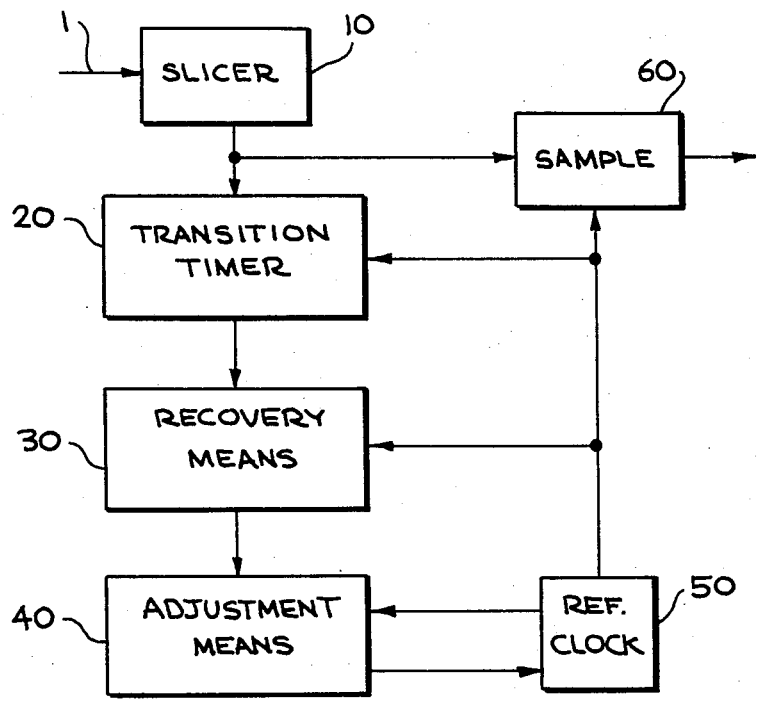
FIG. 2 is a block diagram of the present invention.

An overview of the present invention providing an apparatus for maintaining a first signal substantially in phase with a second signal can be seen with reference to FIG. 2. Basically, circuits which receive a first signal, such as a bipolar code across line 1, have a device, called a slicer 10 in FIG. 2, for detecting the high level threshold corresponding to a high mark and the low level threshold corresponding to a low mark of the first signal. From the slicer 10, the first signal goes to a sample circuit 60 where in our example the incoming bipolar code is decoded. The reference clock 50 provides a second signal, such as timing signals to the sample circuit 60 to assure that the first signal is sampled during optimum portions of a selected period, such as the center of the bit period of a bipolar code.

The present invention provides a transition timer means 20 which, using signals from the slicer 10, times the duration of transitions between the high marks and low marks in the first signal. If the transition time exceeds a selected time period, then the transition timer means 20 causes the transition to be disregarded. In this manner, many distortions in the first signal are filtered from the apparatus of the present invention.

The transition timer means 20 signals a recovery means 30, where a signal is generated from the transition time and compared to the second signal from the reference clock 50. Based on the comparison, a recovery signal is generated which indicates whether the second signal is ahead, behind or in phase with the first signal.

An adjustment means 40 receives the recovery signal from the recovery means 30, and adjusts the reference clock 50 accordingly.

Figure 3:
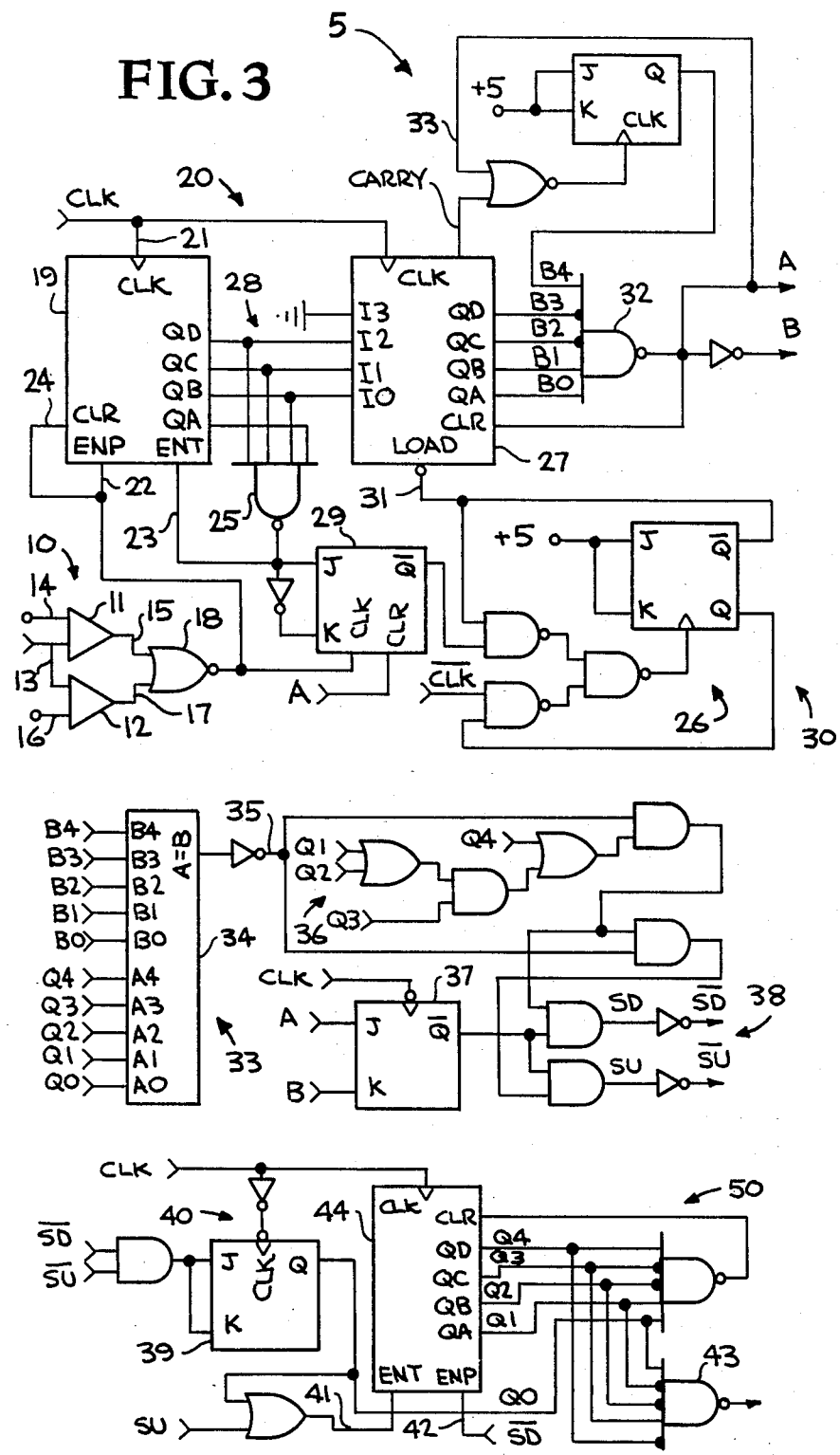
FIG. 3 is a diagram of one implementation of the preferred embodiment.

Details of one implementation of the preferred embodiment can be seen in FIG. 3. The implementation shown may be, for instance, a receiver 5 for a telecommunications circuit receiving a bipolar signal.

The slicer 10 mentioned in connection with FIG. 2 includes a high threshold comparator 11 and a low threshold comparator 12. The bipolar code is received across line 13 by the high-threshold comparator 11 and low threshold comparator 12. When the bipolar code raises above the high threshold level 14 provided at the input of the high threshold comparator 11, the output 15 of the high threshold comparator 11 will go high. Likewise when the bipolar signals swings below the low threshold level 16 provided at the input of the low threshold comparator 12, the output 17 of the low threshold comparator 12 will go high. The output of the NOR-gate 18 will go high during the transitions between a high threshold level and a low threshold level going in either direction. That is the output of the NOR-gate 18 will go high when the bipolar signals swings from a high mark to a low mark or when it swings from a low mark to a high mark. If a space occurs between marks, the output of the NOR-gate 18 will remain high during the entire period of the space. The present invention uses the circuitry of the slicer 10 in order to accomplish the clock recovery needed in a typical telecommunication circuit or other circuits receiving bipolar signals. There is no separate zero detector necessary in the present invention.

A transition timer means 20 is provided for counting a transition time for a transition between a high threshold level and a low threshold level in the bipolar signal. In the embodiment shown in FIG. 3, the transition timer means 20 comprises a first counter 19 (such as commercially available LS163 counter). The first counter 19 receives a clock signal from a clock (not shown) which operates at a multiple of the frequency of the incoming bipolar signal. Typically this clock may operate at about twenty times the frequency of the incoming bipolar code. So in this example there are 20 cycles of the clock for each bit period of the bipolar code. The incoming clock is connected to the first counter 19 on line 21. The first counter 19 includes two enable inputs, enable P input 22 and enable T input 23. The output from the NOR-gate 18 is connected to the first counter 19 at the enable P input 22 and the output of the NOR-gate 18 is connected to the clear input 24 of the first counter 19. The enable T input 23 is connected, as will be explained below, so that the clock will count up to pre-selected value and then be disabled. If the output of the NOR-gate 18 is high, the first counter 19 will count each of the clock cycles until the output of the NOR-gate 18 falls low.

When the output of the NOR-gate 18 of the slicer 10 goes high, the first counter 19 begins counting each clock cycle until the output of the slicer 10 goes low at which time the first counter 19 is cleared.

Should the first counter count up past the pre-selected valued, such as 16 clock cycles as shown in FIG. 3, and represented by the NAND-gate 25, the enable T input 23 would go low and disable the first counter 19 before the output of the slicer 10 goes low. Thus when the bipolar code is sending a space bit or a signal which is distorted to cause the mark to mark transition longer than the preselected 16 cycles in the embodiment shown, the clock recovery apparatus in the present invention will disregard the transition. Thus the transition timer means 20 will time the transition between a high mark and low mark but disregard those transitions which take longer than a pre-selected time period.

Recovery means 30 for generating from the transition time a clock recovery signal which indicates the timing of the reference clock signal, Q0 through Q4 explained below, as compared to the incoming bipolar signal on line 13 is provided on the circuit as shown on FIG. 3.

The transition time counted by the first counter 19 is loaded into a second counter 27 after passing through divider means 28 for dividing the transition time by a value. In this case, the divider means 28 comprises shifting the output of the first counter 19, which is a signal representing the transition time, by one bit position and loading that shifted transition time into the second counter 27. Thus the transition time generated by the first counter 19 is divided by two and input into the second counter 27. As is appreciated in the art, the divider means 28 may be accomplished by a variety of apparatus. Further, the division may be accomplished by any other value as determined by the user which will better represent an apparent zero crossing for the particular signal being received. However, in the preferred embodiment the apparent zero crossing is calculated by dividing the output of the first counter 19, representing the transition time from mark to mark, by two.

As can be seen in the circuit diagram of FIG. 3, the second counter 27 is not loaded if the transition time has exceeded the pre-selected value of 16 cycles. This is accomplished by following the circuit. The output of the NAND-gate 25 drives a flip-flop 29 which is clocked when the output of the slicer 10 goes low. The Q output of the flip-flop 29 feeds a finite state circuit 26 which maintains the load input 31 of the second counter 27 in the load state so long as the output of the NAND-gate 25 remains high. Thus when the first counter 19 exceeds the pre-selected value of 16 cycles in the embodiment shown, the finite state circuit 26 will disable the load input of the second counter 27. Otherwise, the load input of the second counter 27 is enabled so that the transition time after being divided by the divider means 28 as counted by the first counter 19 is loaded into the second counter 27. Of course, the preselection of the portion of the bit period at sixteen cycles as determined by the logic of the NAND-gate 25 may be changed to suit the particular needs of the user. Thus, the recovery means 30 includes means for disregarding the transition time if the transition time is longer than a pre-selected portion of the bit period in the preferred embodiment.

When the second counter 27 is loaded, it counts up until the end of the bit period. In the embodiment shown, the bit period is 20 cycles of the clock, so that recovery means 30 includes a logic circuit for indicating when the second counter 27 has reached the twentieth cycle of the bit period. This logic circuit 32 is accomplished with a NAND-gate as shown in FIG. 3 with an inverted input at the third and fourth bit position. If a four-bit counter is used for the second counter 27 as shown in FIG. 3 the carry circuit 33 as shown is used to generate the fifth bit. The output of the second counter 27 is designated B0 through B4. When the second counter 27 reaches the end of the bit period, the output of the NAND-gate 32 produces a signal A and is passed through an inverter to produce a signal B. These signals are shown at the far right side of the top of the drawing shown in FIG. 3, they pick up again at the left hand side of the next row of circuit in the Figure and are used to generate the clock recovery signal as explained below.

Shown at the bottom of the drawing in FIG. 3, is a reference counter 44. The reference counter 44 counts the clock signals and generates a reference clock signal designated Q0 through Q4 in the Figure. It is this reference counter 44 which is adjusted by the adjustment means 40 described below of the present invention. The reference clock signal Q0 through Q4 is compared with the output B0 through B4 in comparator means 33 for comparing the apparent zero crossing indicated by the output of the second counter 27 with the reference clock signal to generate the clock recovery signal. In the preferred embodiment, the apparent zero crossing is thus indicated by a signal occuring one bit period from the middle of the transition.

In the embodiment shown in FIG. 3, a 5 bit comparator 34 determines whether the reference clock signal, Q0 through Q4, is equal to the output of the second counter 27, B0 through B4. If they are not equal, then the signal at line 35 will be high. This enables logic means 36 to determine whether the value of B0 through B4 is greater than the reference clock signal, Q0 through Q4, or whether it less than the reference clock signal, Q0 through Q4. The logic means 36 can be seen in the Figure as represented by conventional logic symbols for AND-gates and OR-gates. The clock recovery signal is generated each time the output of the NAND-gate 32 goes low corresponding to the second counter 27 reaching the twentieth cycle of the bit period. This is accomplished by driving the flip-flop 37 with the signals A and B as the J and K inputs, respectively. When $\bar{Q}$ of flip-flop 37 is high, the clock recovery signal is generated as determined by the logic means 36. If the logic means 36 indicates that the reference clock signal Q0 through Q4 is greater than the output of the second counter 27, then a slowdown signal SD is generated. If the reference clock signal is less than the output B0 through B4 than a speedup signal SU is generated. In the embodiment shown both the slowdown and speedup signals (SD and SU) are generated along with an inverse for each ($\overline{SD}$ and $\overline{SU}$), which combined comprise the clock recovery signal 38.

Adjustment means 40 for adjusting the reference clock signal Q0 through Q4 in response to the clock recovery signal 38 maintains the reference clock signal substantially in phase with the incoming bipolar signal 13. The adjustment means 40 receives the clock recovery signal 38 in the form of the speed up signal SU and its inverse $\overline{SU}$, and the slowdown signal SD and its inverse $\overline{SD}$. The adjustment means 40 comprises a flip-flop 39 which generates the low order bit Q0 of the reference clock signal. When the speedup SU and the slowdown SD signals are low and hence their inverses are high, then the flip-flop 39 will toggle on each cycle of the clock. Each time the output of the flip-flop 39 is high, the reference counter 44, which generates the referenced clock signal, Q0 through Q4, is enabled through the enable T input 41 while the enable P input 42 is enabled by the slowdown signal SD which is low and its inverse $\overline{SD}$ which is high. Thus when there is neither a slowdown or speedup signal, the reference counter 44 counts without interruption from the adjustment means 40.

When the speedup signal SU goes high, the reference counter 44 will remain enabled while the flip-flop 39 does not toggle. This causes the output Q0 through Q4 to essentially skip a cycle. Thus it is sped up by one cycle in its count to the end of the bit period.

When the slowdown signal SD goes high, its inverse is low so the reference counter 44 is disabled during the slowdown signal SD and the flip-flop 39 does not toggle. In the this manner the referenced counter 44 is stopped for one cycle, thus slowing down the reference clock signal Q0 through Q4. As can be seen in the circuit in FIG. 3, because the flip-flop 37 receiving the signals A and B from the output of the NAND-gate 32 will remain high only for one clock cycle at a time, the speedup SU and slowdown SD signals are only one cycle of duration. Thus, the adjustment means 40 of the present invention merely shifts the reference clock signal Q0 through Q4 by one cycle in the direction tending toward the phase of the incoming bipolar signal 13.

Thus, in operation the present invention times the transition time between a high threshold level and a low threshold level, that is a mark to mark transition, in a first counter 19. The output of the first counter 19 is divided by two by divider means 28 and loaded into a second counter 27. However if the output of the first counter 19 exceeds a pre-selected value, then the transition is disregarded. When the output of the first counter 19 is divided by the divider means 28, it is loaded into the second counter 27, the second counter 27 counts up to the end of the bit period. At the end of the bit period, the recovery means 30 of the present invention compares the output of the second counter 27 with the reference clock signal Q0 through Q4 in order to determine whether the reference clock signal is in phase with the incoming clock bipolar signal. From the comparison done in the comparator means 33, a clock recovery signal 38 is generated which drives an adjustment means 40 for adjusting the reference clock signal. The reference clock signal then may be sped up by one cycle, or slowed down by one cycle or left unadjusted, depending on the clock recovery signal 38. The adjustment occurs for each mark to mark transition which takes in less time than the pre-selected portion of the bit period. For the present circuit which has a bit period of 20 clock cycles, all transitions which have a transition time of greater than 16 clocks are disregarded.

Shown in FIG. 3 is an additional gate 43 which is used to calculate the mid point of the bit period. When the mid point of the bit period is reached, the output of the gate 43 goes high and the circuit receiving the bipolar signal may sample the bipolar code of the signal or otherwise operate on it during the center of the bit period. The apparatus for clock recovery disclosed in FIG. 3 continually adjusts the phase of the reference clock signal to maintain it in phase with the incoming bipolar signal so that the output of the gate 43 will correspond as closely as possible to the mid point of the bit period and assure proper sampling of the data contained therein.

It should be appreciated that the circuit disclosed in FIG. 3 represents one implementation of the preferred embodiment. The logic gates employed and the values chosen for the length of the bit period and so forth could change as suits the user. Further there may be multiple implementations of the logic described herein.

Further aspects and advantages of the present invention can be seen from a study of the drawing, the specification and the appended claims.

We claim:

1. An apparatus for maintaining one signal in phase with another signal having a transition between a first level and a second level, comprising:
   (a) transition timer means for generating a first signal indicating a duration of the transition of the other signal;
   (b) recovery means, responsive to said first signal, for generating a recovery signal indicating the timing of the one signal relative to the other signal said recovery means including means for disregarding said first signal if said transition duration is longer than a preselected time; and
   (c) adjustment means for adjusting the one signal in response to said recovery signal.

2. The apparatus of claim 1, wherein said recovery means comprises:
   (a) divider means for dividing said first signal by a value at the end of said transition to generate an apparent zero crossing signal during said transition; and
   (b) comparator means for comparing said apparent zero crossing signal with said one signal to generate said recovery signal.

3. The apparatus of claim 1, wherein said recovery signal includes a speedup signal and a slowdown signal, and wherein said adjustment means includes means for accelerating said one signal by at least one cycle in response to said speedup signal and means for decelerating said one signal by at least one cycle in response to said slowdown signal.

4. In a circuit for receiving a bipolar signal having implicit bit-periods with respect to predetermined high threshold and a low threshold levels, said circuit having a reference clock signal, an apparatus for clock recovery comprising:
   (a) transition timer means for generating a count signal indicating a transition duration of a transition between said high threshold level and said low threshold level in said bipolar signal;
   (b) recovering means for generating from said count signal a clock recovery signal indicating the timing of said reference clock signal as compared to said bipolar signal, said recovery means including means for disregarding said count signal if said transition duration is longer than a preselected portion of a bit period; and
   (c) adjustment means for adjusting said reference clock signal in response to said clock recovery signal to maintain said reference clock signal substantially in phase with said bipolar signal.

5. The apparatus of claim 4, wherein said bipolar signal has a first frequency and a plurality of bit periods during which bits are transmitted in the form of a high mark, a low mark or a space for each bit period, and wherein said recovery means comprises:
   (a) divider means for dividing said transition duration by a value at the end of said transition to generate an apparent zero crossing signal during said transition; and
   (b) comparator means for comparing said apparent zero crossing signal with said reference clock signal to generate said clock recovery signal.

6. The apparatus of claim 5, wherein said comparator means comprises:
   (a) counter means for counting at least a portion of said bit period from said apparent zero crossing signal to generate a reference count signal; and
   (b) means for comparing said reference count signal with said reference clock signal to generate said clock recovery signal.

7. The apparatus of claim 4, wherein said recovery means comprises:
   (a) divider means for dividing said count signal by a value at the end of said transition to generate an apparent zero crossing signal during said transition; and
   (b) comparator means for comparing said apparent zero crossing signal with said reference clock signal to generate said clock recovery signal.

8. The apparatus of claim 4, wherein said clock recovery signal includes a speedup signal and a slowdown signal, and wherein
   (a) said adjustment means includes means for accelerating said reference clock signal by at least one cycle in response to said speedup signal and means for decelerating said reference clock signal by at least one cycle in response to said slowdown signal.

9. The apparatus of claim 4 wherein said transition timer means starts counting when said bipolar signal crosses one level of said high-threshold level or said low threshold level and stops counting when said bipolar signal crosses the other level of said low threshold level or said high threshold level.

10. In a telecommunications circuit receiving a bipolar signal, said bipolar signal having a first frequency and a plurality of bit periods during which bits are transmitted in the form of a high mark, a low mark or a space for each bit period, said telecommunication circuit having a reference clock signal with a second frequency which is a multiple of the first frequency of said bipolar signal, an apparatus for clock recovery, comprising:
   (a) transition timer means for generating a count signal indicating a transition duration of transition between a high threshold level corresponding to a high mark and a low threshold level corresponding to a low mark in said bipolar signal;
   (b) means for causing said transition timer means to start counting when said bipolar signal crosses either one of said high threshold level or said low threshold level and stop counting when said bipolar signal crosses the other one of said high threshold level or said low threshold level;

(c) recovery means for generating from said count signal a clock recovery signal indicating the timing of said reference clock signal relative to said bipolar signal, said recovery means including:
  (i) divider means for dividing said transition duration by a value after said transition to generate an apparent zero crossing signal during said transition,
  (ii) comparator means for comparing said apparent zero crossing signal with said reference clock signal to generate said clock recovery signal, and
  (iii) said clock recovery signal including a speed up signal for indicating that said reference clock signal is behind the phase of said bipolar signal and a slowdown signal indicating that said reference clock signal is ahead of the phase of said bipolar signal; and (d) adjustment means for adjusting said reference clock signal in response to said clock recovery signal to maintain said reference clock signal substantially in phase with said bipolar signal, said adjustment means including,
  (i) means for accelerating said reference clock signal by at least one cycle in response to said speed up signal, and
  (ii) means for decelerating said reference clock signal by at least one cycle in response to said slow down signal.

11. The apparatus of claim 10 wherein
said recovery means includes means for disregarding said count signal if said transition duration is longer than a preselected portion of said bit period.

12. The apparatus of claim 10 wherein said comparator means comprises:
  (a) counter means for counting at least a portion of said bit period from said apparent zero crossing signal to generate a reference count signal; and
  (b) means for comparing said reference count signal with said reference clock signal to generate said clock recovery signal.

* * * * *